United States Patent
Leung

(10) Patent No.: US 6,373,804 B2
(45) Date of Patent: *Apr. 16, 2002

(54) CD/CASSETTE PLAYING MECHANISM

(75) Inventor: Wilson Wai Sing Leung, Hong Kong (HK)

(73) Assignee: Alco Electronics Limited, Quarry Bay (HK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,725

(22) Filed: Oct. 16, 1998

(51) Int. Cl.[7] ............................ G11B 33/02; G11B 11/00
(52) U.S. Cl. ........................................ 369/75.1; 369/15
(58) Field of Search ..................... 369/75.1, 15, 292, 369/273, 63; 360/137, 94

(56) References Cited

U.S. PATENT DOCUMENTS

| | | | | |
|---|---|---|---|---|
| 2,029,730 A | * | 2/1936 | Mallina | 369/15 |
| 2,519,597 A | * | 8/1950 | Owens | 369/15 |
| 2,611,618 A | * | 9/1952 | Camras | 369/15 |
| 2,625,611 A | * | 1/1953 | Roberts | 369/15 |
| 3,054,616 A | * | 9/1962 | Ross | 369/15 |
| 4,445,159 A | * | 4/1984 | Nemoto et al. | 360/137 |
| 4,723,181 A | * | 2/1988 | Hickok | 360/72.2 |
| 4,864,425 A | * | 9/1989 | Blazek et al. | 386/107 |
| 5,349,575 A | | 9/1994 | Park | 369/1 |
| 5,666,342 A | | 9/1997 | Kim | 369/75.2 |
| 5,815,468 A | * | 9/1998 | Muramatsu et al. | 369/2 |

FOREIGN PATENT DOCUMENTS

| | | | |
|---|---|---|---|
| EP | 0366118 | | 5/1990 |
| EP | 0526215 | | 2/1993 |
| JP | 57-86102 | * | 5/1982 |

\* cited by examiner

Primary Examiner—Hoa T. Nguyen
Assistant Examiner—Julie Anne Watko
(74) Attorney, Agent, or Firm—Leydig, Voit, & Mayer, Ltd.

(57) ABSTRACT

A CD/cassette playing mechanism includes a CD playing module and a cassette playing module supported on a chassis. The CD playing module includes a CD spindle for supporting a CD and a laser head on one side of the CD spindle for reading the CD. The cassette playing module includes a compartment for receiving a cassette tape, a pair of tape spindles for running the cassette tape, and tape playback and recording heads. A part of the cassette playing module is accommodated in the space on a side of the CD spindle other than the side where the laser head is located and partially opposite a CD in the CD playing module.

14 Claims, 4 Drawing Sheets

CD/CASSETTE PLAYING MECHANISM

The present invention relates to a mechanism which is capable of playing a compact disc, i.e., a CD, and a cassette tape and a player incorporating such a playing mechanism.

BACKGROUND OF THE INVENTION

Playing mechanisms for playing CDs and cassette tapes are of course known. Although these two types of playing mechanisms sometimes co-exist in a multi-function player, they are simply put together in the sense of that they share the same player body, without much consideration to the question of space-saving.

The invention seeks to provide a combined CD/cassette playing mechanism which is compact in size and a player incorporating the same.

SUMMARY OF THE INVENTION

According to the invention, there is provided a combined CD/cassette playing mechanism formed by a CD playing module and a cassette playing module supported on a chassis, the CD playing module comprising a CD spindle for supporting a CD and a laser head on one side of the CD spindle for reading the CD, and the cassette playing module comprising a compartment for receiving a cassette tape, a pair of tape spindles for running the cassette tape and tape playback and recording heads, wherein a part of the cassette playing module is accommodated in the space on a side of the CD spindle other than the laser head side and immediately behind the CD for space-saving.

In a preferred embodiment, the CD playing module and the cassette playing module are positioned close together to face in opposite directions.

More preferably, the cassette playing module has a front layer occupied by the compartment and a rear layer occupied by a cassette operating mechanism, a part of the rear layer being accommodated in the space.

It is further preferred that a part of the CD playing module is accommodated in a space level with the rear layer and immediately behind the front layer of the cassette playing module.

It is yet further preferred that the CD playing module includes an electric motor for rotating the CD spindle, a part of the motor being the part accommodated in the second mentioned space.

In another preferred embodiment, the CD playing module and the cassette playing module are positioned close together to face in the same direction.

More preferably, a part of the cassette compartment is the part accommodated in the space.

It is preferred that the space accommodating the part of the cassette playing module is on the side of the CD spindle directly opposite to the laser head and partially directly opposite a CD mounted on the CD spindle.

For maximum space-saving, the part of the cassette playing module accommodated in the space corresponds to a base part of the cassette tape received in the compartment.

Preferably, the chassis supporting the CD playing module and the cassette playing module is a one-piece structure.

More preferably, the chassis is integrally moulded from plastic material.

It is preferred that the CD playing module and cassette playing module include a single electric motor for rotating the CD spindle and tape spindles.

The invention also provides a portable player incorporating such a combined CD/cassette playing mechanism.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
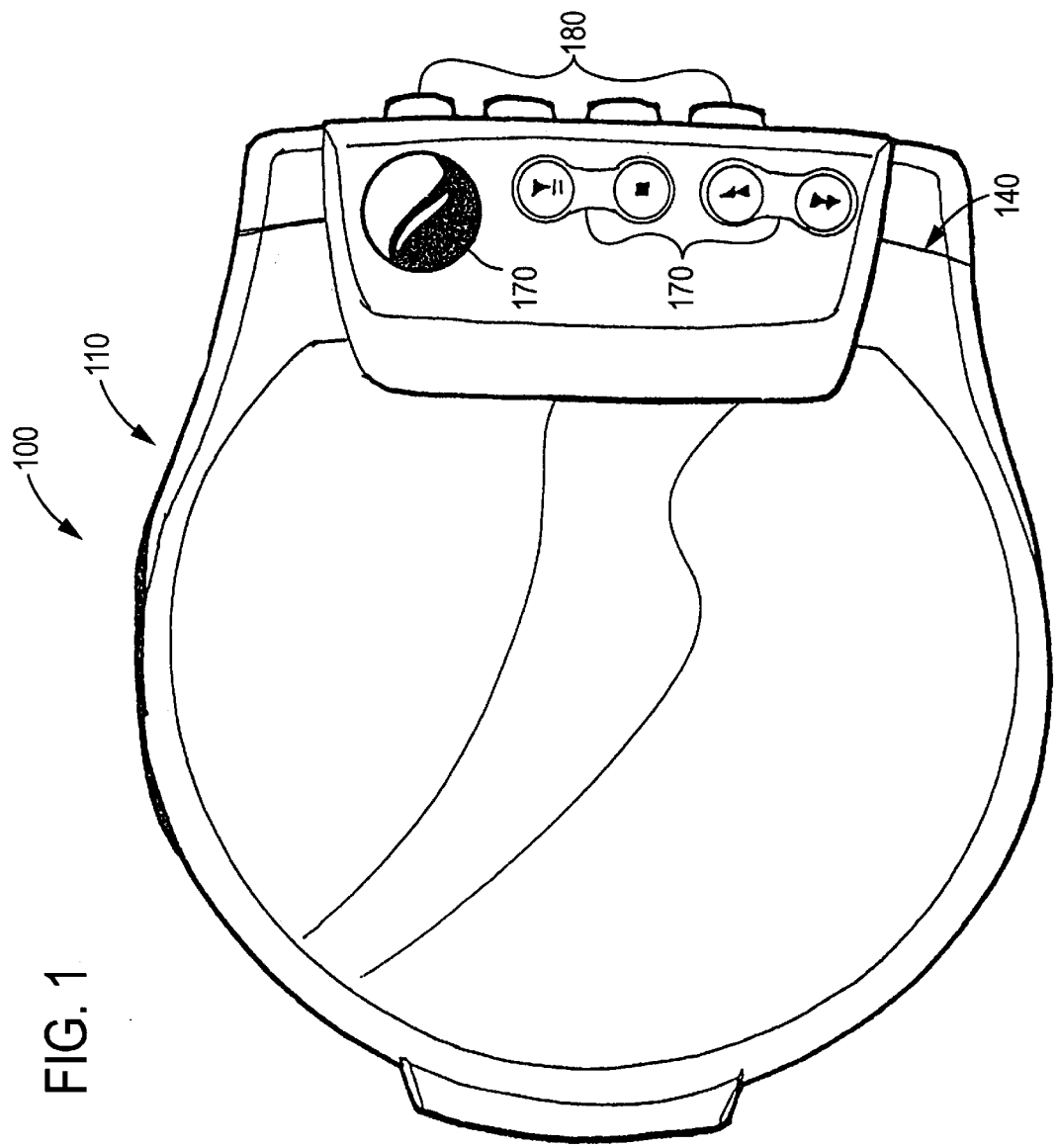
FIG. 1 is a top plan view of a player incorporating an embodiment of a combined CD/cassette playing mechanism in accordance with the invention.
Figure 2:
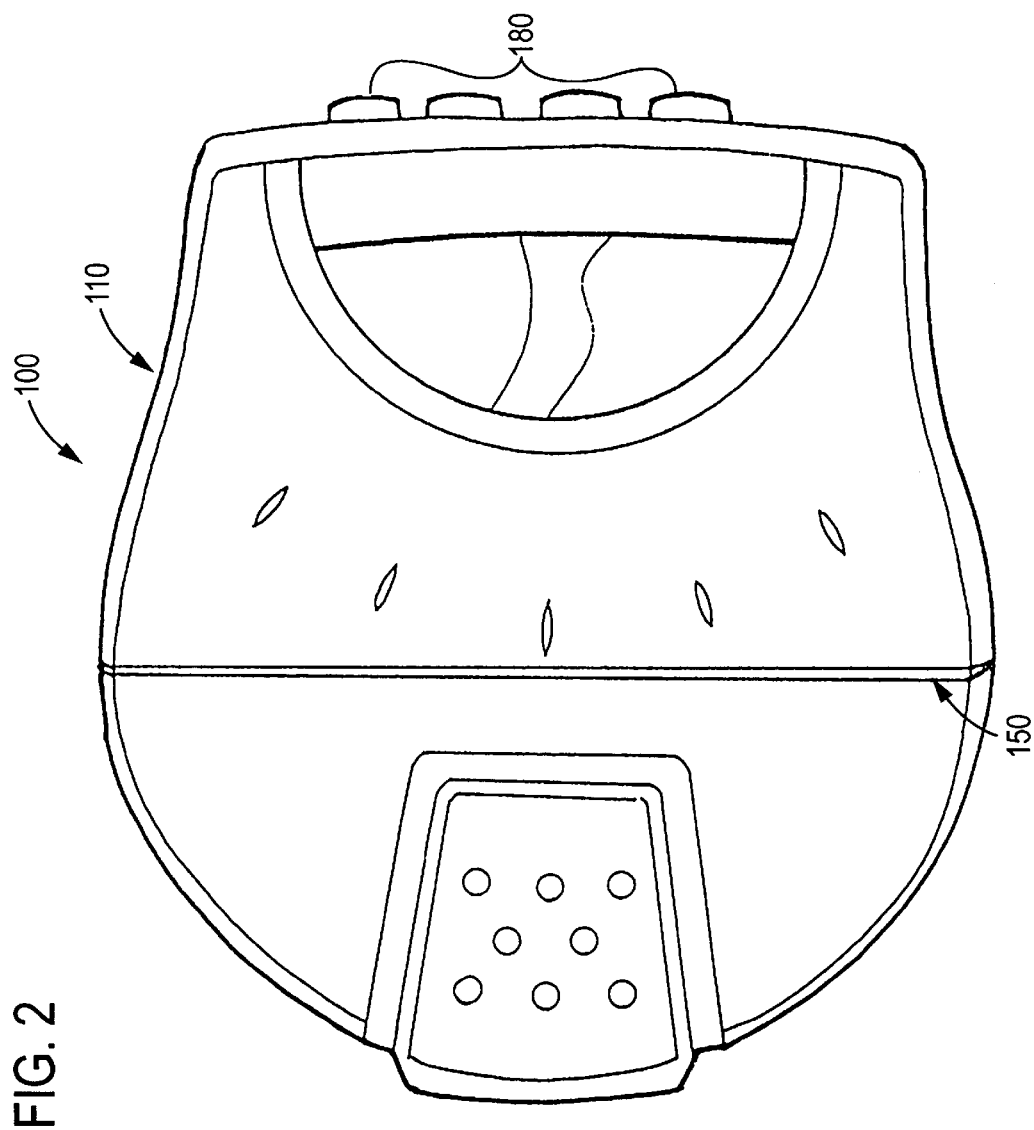
FIG. 2 is a bottom plan view of the player of FIG. 1.
Figure 3:
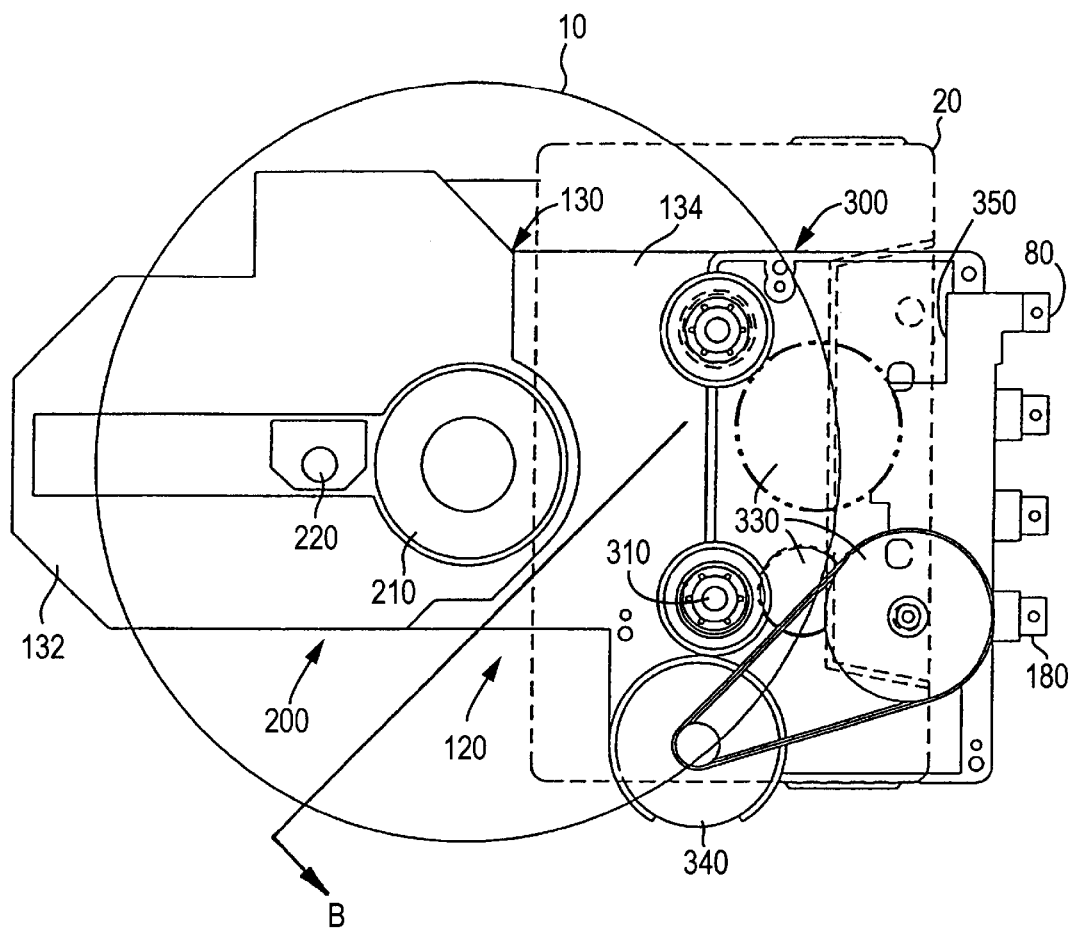
FIG. 3 is a top plan view of the playing mechanism used in the player of FIG. 1.

Referring initially to FIGS. 1 to 4 of the drawings, there is shown a portable player 100 incorporating a combined CD/cassette playing mechanism 120 embodying the invention, which player 100 has a generally flat body 110 with a hinged lid 140 on the front side for CD loading/unloading and a hinged lid 150 on the rear side for cassette tape loading/unloading. As shown, usual CD control buttons 160 and LCD display 170 are located on the right side of the body front side, and usual cassette control keys 180 are located on the adjacent narrow right side.

Figure 4:
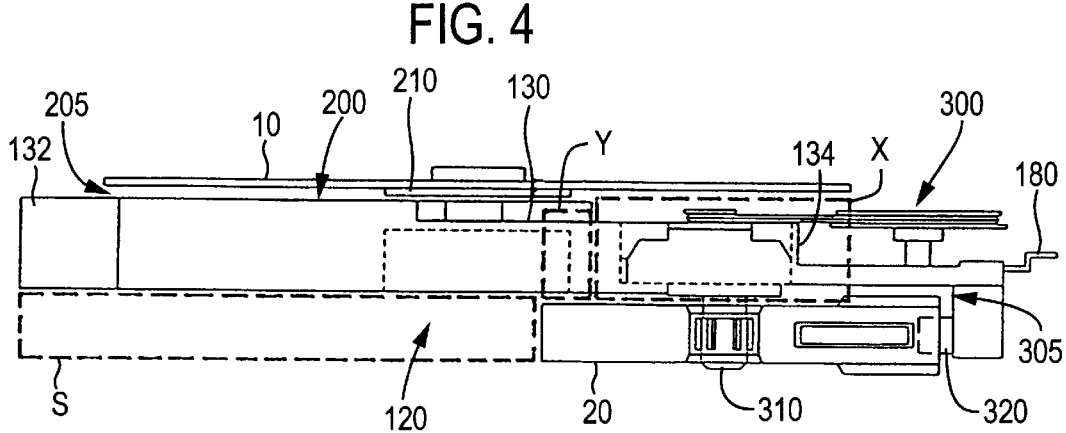
FIG. 4 is a side view of the playing mechanism of FIG. 3.

The playing mechanism 120 includes by a CD playing module 200 and a cassette playing module 300, which share a common chassis 130 having, in FIG. 4, respective left and right portions 132 and 134. Being supported by the left chassis portion 132, the CD playing module 200 includes a CD spindle 210 for supporting and spinning a CD 10 in a CD compartment 205 located immediately beneath the body front lid 140, a sliding laser head 220 located on the left side of the CD spindle 210 for reading the CD 10 in motion, and an electric motor 230 provided co-axial with and below the CD spindle 210 for rotating the CD spindle 210 as well as sliding the laser head 220.

Figure 5:
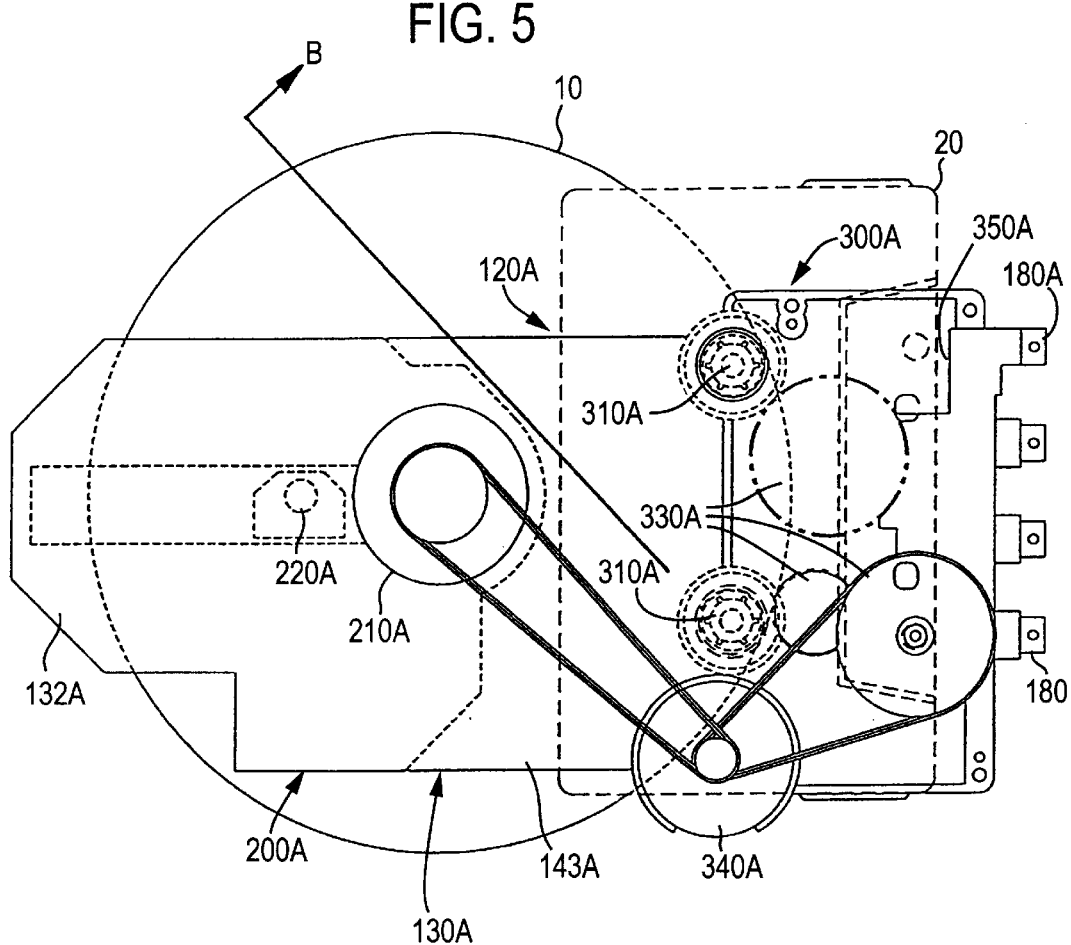
FIG. 5 is a bottom plan view of another embodiment of a combined CD/cassette playing mechanism in accordance with the invention.

As the laser head 220 is able to scan the whole CD 10 by travelling along a single radius (pointing to the left as shown in FIG. 5) with respect to the CD spindle 210, the CD playing module 200 only takes up space from the CD spindle 210 to the laser head 220 on the left side as shown, where the left chassis portion 132 lies. This leaves the space (as shown by X in FIG. 4) on the opposite, right side of the CD spindle 210 and directly opposite almost half of the CD 10 available for accommodating a part (as also shown by X) of the cassette playing module 300.

The cassette playing module 300 is supported by the right chassis portion 134 and includes a cassette compartment 305 located immediately behind the body rear lid 150, a pair of tape spindles 310 for running a cassette tape 20 received inside the compartment 305, tape playback/recording heads 320 on the right side, a reversible gear train 330 in between, an electric motor 340 for rotating the spindles 310 via the gear train 330, and various key operating plates 350 associated with the control keys 180. All these parts, excluding the compartment 305, only take up space from the tape spindles 310 to the heads 320 on the right side as shown. This leaves the space (as shown by Y in FIG. 4) on the opposite, left side of the tape spindles 310 and immediately behind the base (opposite to the part/side open for the heads 320) of the cassette tape 20 available for accommodating a part (as also shown by Y) of the CD playing module 200.

The cassette playing module 300 can be taken to have two layers, with the front layer occupied by the cassette compartment 305 and the rear layer occupied by the cassette operating mechanism including the gear train 330, the motor 340 and the key operating plates 350. The part X of the cassette playing module 300 is essentially the left part of the rear layer, as shown. In other words, the space Y is level with the rear layer and immediately behind the front layer of the cassette playing module 300. The part Y of the CD playing module 200 is essentially the off-axis right part of the motor 230, as shown.

The two playing modules 200 and 300 are positioned close together and face in opposite directions. The utilisation of the space X on the right side of the CD spindle 210 and directly opposite almost half of the CD 10 in use to accommodate the part X of the cassette playing module 300 is space efficient. Space-saving is further enhanced by reason of the use of the space Y on the left side of the tape spindles 310 and immediately behind the base part of the cassette tape 20 to accommodate the part Y of the CD playing module 200. This arrangement considerably reduces the overall foot print of the two playing modules 200 and 300, resulting in an overall size across which is not much larger than that of the CD playing module 200 alone, being only slightly longer.

The cassette tape 20 is loaded on the side of the playing mechanism 120 opposite to the CD 10. With the cassette tape 20 protruding in terms of thickness, the space level with it and close to the same side of the CD playing module 200 is used to accommodate the electronic circuitry of the player 100.

Figure 6:
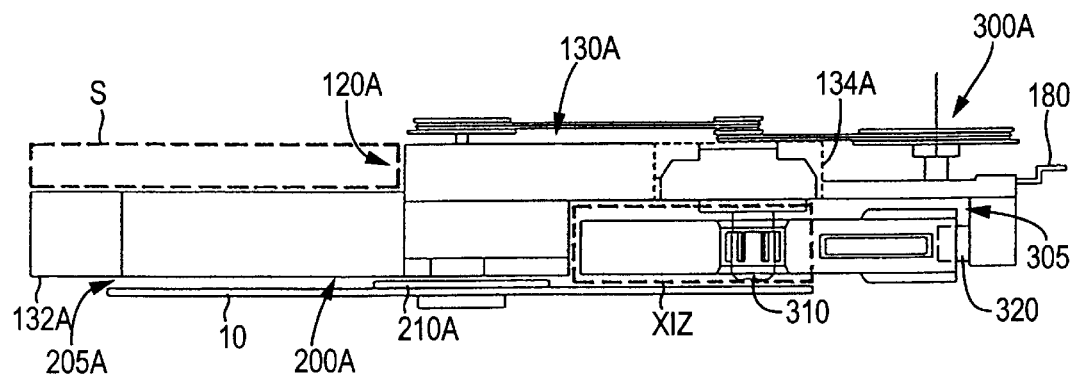
FIG. 6 is a side view of the playing mechanism of FIG. 5.

Reference is now made to FIGS. 5 and 6 of the drawings, in which another combined CD/cassette playing mechanism 120A embodying the invention is shown for use in a portable player of the same type. Most of the parts of this playing mechanism 120A are similar to those of the earlier playing mechanism 120, with like parts designated by like reference numerals suffixed by a letter "A". The only differences lie in the cassette playing module 300A being placed upside down and in the use of a single electric motor 340A (the motor 230 does not have an equivalent here).

In this playing mechanism 120A, the two playing modules 200A and 300A are positioned close together and face in the same direction. Now accommodated in the space X (on the right side of the CD spindle 210A and immediately behind almost half of the CD 10 in FIG. 6) is a part Z of the cassette playing mechanism 300A, which is, as shown, the left side of the cassette compartment 305A receiving the base part of the cassette tape 20 including the spindles 310A. As the cassette tape 20 now faces on the same side as the CD 10, only a single hinged lid on the player body is needed. For loading/unloading of the cassette tape 20, the CD 10 must first be removed.

More specifically, the chassis 130A is made in a generally staggered manner, such that the cassette compartment 305A lies at the same level with the CD playing module 200A. With the cassette playing module 300A protruding in terms of thickness, the space level with it and on the same side of the CD playing module 200A is used to accommodate the electronic circuitry of the player. The motor 340A, being a part of the cassette playing module 300A, is also used to rotate the CD spindle 210A of the CD playing mechanism 200A by means of a belt, as shown.

In either playing mechanism 120/120A, the space used to accommodate a part of the cassette playing module 300/300A is on the side of the CD spindle 210/210A directly opposite to the laser head 220/220A. Alternatively, the cassette playing module part may be accommodated in the space on any side of the CD spindle 210/210A other than that directly opposite to the laser head 220/220A, such as the side as shown by arrows B in FIGS. 3 and 5 (with the CD playing module 200/200A turned by an angle of about 45°).

It is envisaged that the playing mechanism of the subject invention may be used in any other types of players, such as a portable player having a top handle or a car hi-fi system. In the case of a car hi-fi system, the body of the player may be slidable in and out for the loading/unloading of CD and cassette tape, without the need of a lid. Alternatively, suitable slots may be provided for CD and cassette loading/unloading.

In the described embodiments, the chassis 130 or 130A is integrally moulded from plastic material as a one-piece structure. It may alternatively be made of metal and formed by connecting various metal parts together.

The invention has been given by way of example only, and various other modifications of and/or alterations to the described embodiments may be made by persons skilled in the art without departing from the scope of the invention as specified in the appended claims.

What is claimed is:

1. A CD/cassette playing mechanism including:
    a chassis;
    a compact disc (CD) playing module and a cassette playing module, both of the CD playing module and the cassette playing module being mounted on the chassis and in fixed spatial relationship to each other and the chassis,
    the CD playing module comprising
        a CD spindle for supporting and rotating a CD and a laser head for reading a CD supported by the CD spindle, the laser head being located on a laser head side of the CD spindle, and
    the cassette playing module comprising
        a compartment for receiving a cassette tape having a base, a pair of tape spindles for running a cassette tape received in the compartment, and tape playback and recording heads for reproducing sound from and recording sound on a cassette tape received in the compartment, wherein a part of the cassette playing module proximate the base of a cassette tape received in the compartment is accommodated in a space in the playing mechanism proximate to and on a side of the CD spindle other than the laser head side and directly opposite a part of a CD supported on the CD spindle in the CD playing module.

2. The CD/cassette playing mechanism as claimed in claim 1, wherein the CD playing module and the cassette playing module face in opposite directions and respectively support a CD on the CD spindle and a cassette tape received in the compartment on opposite sides of the chassis.

3. The CD/cassette playing mechanism as claimed in claim 2, wherein the cassette playing module has laminated first and second layers, the first layer including the compartment and the second layer including a cassette operating mechanism, a part of the second layer being the part of the cassette playing module accommodated in the space in the playing mechanism proximate to and on a side of the CD spindle other than the laser head side.

4. The CD/cassette playing mechanism as claimed in claim 3, wherein a part of the CD playing module is located in a second space coplanar with the second layer and directly opposite the cassette playing module.

5. The CD/cassette playing mechanism as claimed in claim 4, wherein the CD playing module includes an electric motor for rotating the CD spindle, a part of the motor being the part of the CD playing module accommodated in the second space.

6. The CD/cassette playing mechanism as claimed in claim 1, wherein the CD playing module and the cassette playing module face in the same direction for supporting a CD on the CD spindle and receiving a cassette tape on the same side of the chassis.

7. The CD/cassette playing mechanism as claimed in claim 6, wherein a part of the cassette compartment is the part of the cassette playing module accommodated in the space in the playing mechanism proximate to and on a side of the CD spindle other than the laser head side.

8. The CD/cassette playing mechanism as claimed in claim 1, wherein the space in the playing mechanism proximate to and on a side of the CD spindle other than the laser head side and accommodating the part of the cassette playing module is located on a side of the CD spindle directly opposite to the laser head and directly opposite a CD supported on the CD spindle.

9. The CD/cassette playing mechanism as claimed in claim 1, wherein the chassis supporting the CD playing module and the cassette playing module is a one-piece structure.

10. The CD/cassette playing mechanism as claimed in claim 9, wherein the chassis is a unitary plastic body.

11. The CD/cassette playing mechanism as claimed in claim 1, wherein the CD playing module and the cassette playing module include a single electric motor for rotating the CD spindle and the tape spindles.

12. The CD/Cassette playing mechanism as claimed in claim 1, wherein both of the CD playing module and the cassette playing module are stationarily mounted on the chassis.

13. A player incorporating a CD/cassette playing mechanism, the mechanism including:

a chassis;

a compact disc (CD) playing module and a cassette playing module, both of the CD playing module and the cassette playing module being mounted on the chassis and in fixed spatial relationship to each other and the chassis, the CD playing module comprising a CD spindle for supporting and rotating a CD and a laser head for reading a CD supported by the CD spindle, the laser head being located on a laser head side of the CD spindle, and the cassette playing module comprising a compartment for receiving a cassette tape having a base, a pair of tape spindles for running a cassette tape received in the compartment, and tape playback and recording heads for reproducing sound from and recording sound on a cassette tape received in the compartment, wherein a part of the cassette playing module proximate the base of a cassette tape received in the compartment is accommodated in a space in the playing mechanism proximate to and on a side of the CD spindle other than the laser head side and directly opposite a part of a CD supported on the CD spindle in the CD playing module.

14. The CD/cassette playing mechanism as claimed in claim 13, wherein both of the CD playing module and the cassette playing module are stationarily mounted on the chassis.

* * * * *